Patented May 24, 1932

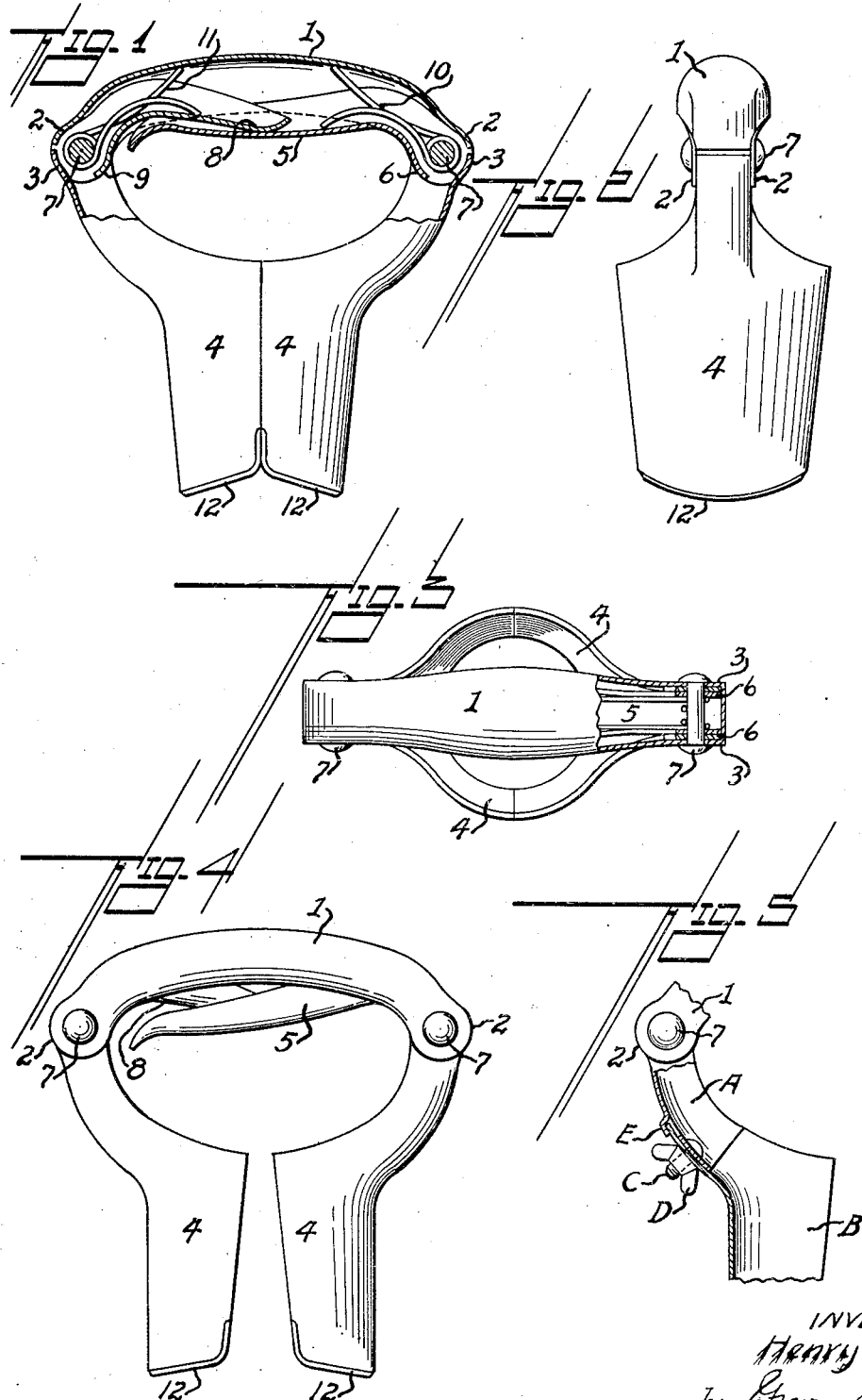

1,859,603

UNITED STATES PATENT OFFICE

HENRY J. RISSI, OF COLLINSVILLE, ILLINOIS

TRANSPLANTING TOOL

Application filed July 18, 1931. Serial No. 551,693.

My invention relates to tools adapted to the work of the florist and gardener, and provides a tool of this character for the purpose of transplanting flowers or plants from the original hot bed to the field or any location where the flower or plant is to grow to maturity.

The invention seeks to overcome the difficulty commonly resorted to in the old method of transplanting by making a small hole with a tool or the like, and as water is usually applied for this purpose the dirt almost invariably falls into and filling the hole to such extent that it becomes very effective in depriving the plant of an adequate depth for the roots thereof, while my invention provides a means whereby the proper size hole is made and the wall of the hole is completely protected as the plant is being embedded within the same. The tool is also constructed so as to lift the flower or plant from the hot bed in a manner that positively prevents injury to the body or the roots thereof, and this is a very important advantage as injury to the roots of a plant would impair or obstruct its normal growth and development to the stage of a healthy maturity.

The invention possesses further advantages, all of which will be clearly revealed during the course of the following detailed description, illustrated throughout the accompanying drawings, and more fully pointed out in the appended claims.

With direct reference to the drawings:

Figure 1 is a partial side elevation and sectional view of the invention.

Figure 2 is an end elevation.

Figure 3 is a partial top plan and sectional view.

Figure 4 is a side elevation showing the device in an opened position.

Figure 5 is a section of a portion of a modified form of the invention, illustrating the use of detachably engaged blades to the handle portion thereof.

The invention comprises handle portion which is indicated by the numeral 1, and having formed thereupon ears 2, and the said ears adapted to engage similarly formed ears 3 of members 4 respectively. With particular reference to Figure 3 it will be seen that lever 5 is also provided with similar ears shown at 6, and all of the said ears having an opening through the center of the same to admit of the passage of rivet or stud 7, and the said ears connected in a manner so as to permit their free oscillation relative to one another.

Lever 8 is also provided and has ears 9 which are in the same relation to ears 2 of members 4 as lever 5, and with reference to Figure 1 it is clearly seen that spring 10 is coiled upon one of the rivets 7, and one end of the said spring adapted to bear upon the inner surface of lever 5, while the opposite end thereof bearing against the inner surface of handle portion 1; additional spring 11 is provided and one end of this spring bearing upon the inner surface of lever 8, while the opposite end thereof bears against the inner surface of portion 1.

In Figures 1 and 4 it is observed that sharpened edge 12 is provided for each of members 4.

The details of construction of the invention having been explained throughout the preceding paragraphs, the operation thereof immediately follows:

Referring to Figure 1 it is clearly seen that the end of lever 8 actuates within lever 5, and by virtue of the tension of springs 10 and 11 expanding respectively between the inner surfaces of levers 5 and 8 and the inner surface of handle portion 1 members 4 remain as in Figure 4, or in other words the device is normally in an opened position when not in use. The device is pressed into the soil over the plant, lever 5 is slightly compressed by the hand, which is now grasping handle portion 1, which bring members 4 to a close as in Figure 1. In this manner a sufficient amount of the soil including the roots of the plant are firmly held within the device and the plant is carried to the field or otherwise and set into the hole previously made by the tool. The tool is then released and the plant likewise placed in its proper position for further growth and development.

Referring at this time to Figure 5, I show a modified form which form provides members 4 as of A which are adapted to engage detachable cutting blades B, and this is accomplished by means of thumb screw C and thumb nut D, with lip E which is pierced from the metal of member A and overlapping the metal of blade B as shown. An important advantage of the detachable blade method is that one principal handle portion or tool may be used with the application of a variety of sizes of cutting blades available for use instead of the necessity of having a complete tool for each size required.

One advantage of my invention and one of no less importance than those heretofore explained is that due to the extreme simple construction thereof the production cost is held within the minimum and the selling price likewise within the reach of all. It is also very substantial and with ordinary care should endure for an indefinite period.

While I have hereinabove described with the aid of the accompanying drawings one precise embodiment of my invention, the same is nevertheless susceptible to certain minor changes in the details of construction falling within the scope of the general principle claimed, in the necessity of any changes during probable further development for the market.

Having thus described my invention, what is claimed as new is:

1. In a transplanting tool a handle portion for the same, a pair of ears formed upon each end of the said portion, the said handle portion being semi-circular in formation, a lever having a pair of ears formed upon one end thereof and the said ears to engage the ears of the said handle portion, also an additional lever having similar ears formed upon one end thereof and to engage the ears upon the opposite side of the said handle portion, one end of the last-named lever adapted to actuate within the first-named lever and both of the said levers adapted to actuate within the aforesaid handle portion.

2. In a transplanting tool of the class described, a hollow handle portion for the same, a pair of the oppositely disposed levers within the said handle portion, the said levers pivotally secured to the said handle portion by means of a transversely extending rivet through the ears of the same respectively, a spring coiled upon the said rivet for each of the said levers, one end of the said spring adapted to bear upon the inner surface of the first-named lever and the opposite end thereof against the inner surface of the aforesaid handle portion, and the remaining spring having the same relation with the last-named lever.

3. In a transplanting tool, a handle portion for the same, a pair of opposed levers pivotally secured to the said handle portion and adapted to actuate within the same, a spring interposed between the inner surface of each of the said levers and the inner surface of the said handle portion, a pair of opposed cutting members having ears formed upon the upper end thereof and pivotally secured to the said handle portion, the action of the aforesaid springs causing the said members to remain normally open at the bottom thereof and to close in response to compressing the aforesaid levers by the hand in the normal operation of the device.

4. In a device of the character described, a hollow handle portion, a pair of oppositely disposed levers pivotally secured to the said handle portion, one of the said levers adapted to actuate within the remaining lever, a pair of opposed cutting members for the device, the said members pivotally secured to the aforesaid handle portion, a spring coiled upon each of the rivets for the said pivotal joints, one end of the said spring bearing upon the inner surface of one of the aforesaid levers and the opposite end thereof bearing against the inner surface of the aforesaid handle portion, the remaining spring having the same relation with the remaining aforesaid lever, the action of the said springs expanding between the inner surfaces of the said handle portion and levers adapted to normally retain the lower end of the aforesaid cutting blades in an opened position and these ends closed responsive to manually gripping the aforesaid handle portion in the normal operation of the device.

In testimony whereof I hereunto affix my signature.

HENRY J. RISSI.